Nov. 19, 1968  L. W. SMITH  3,411,830
AIR-CUSHIONING PNEUMATIC CONVEYOR
Filed Nov. 14, 1966
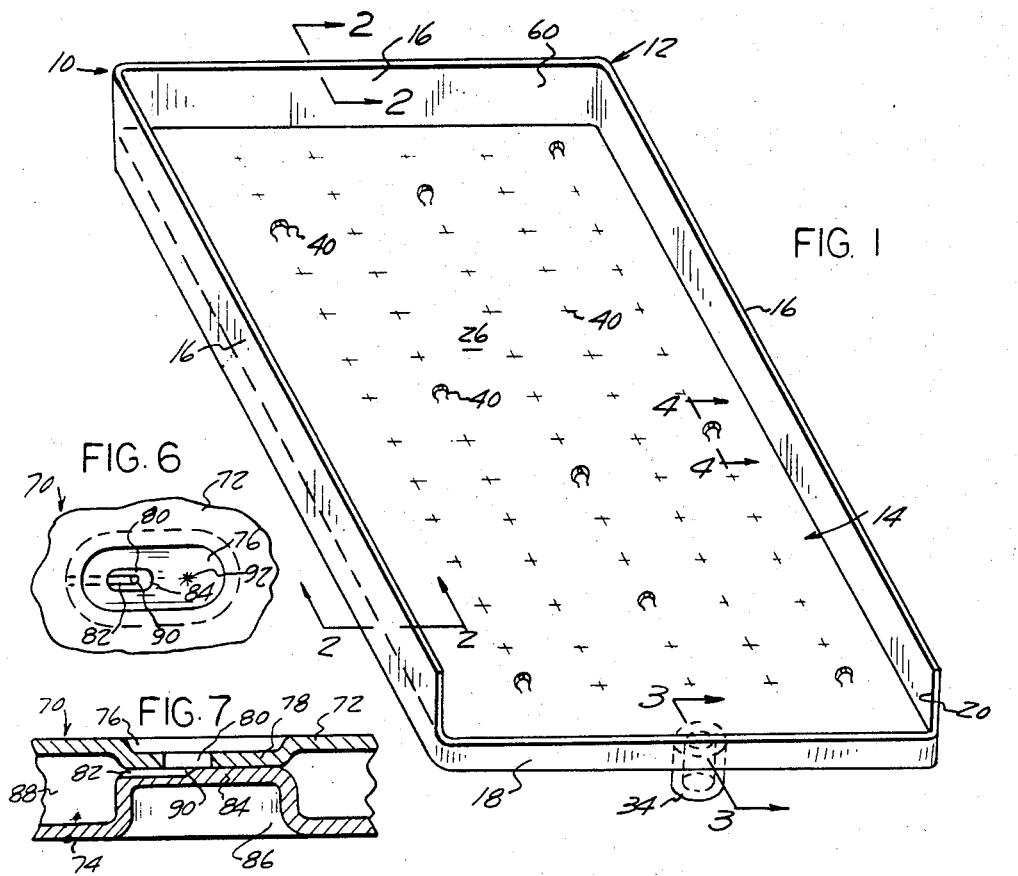
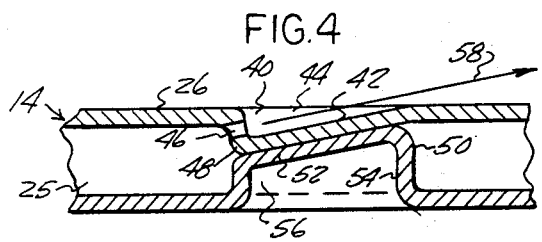
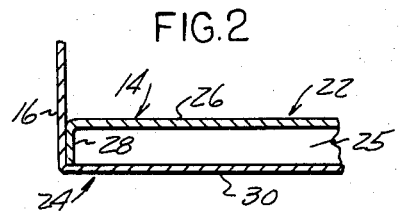
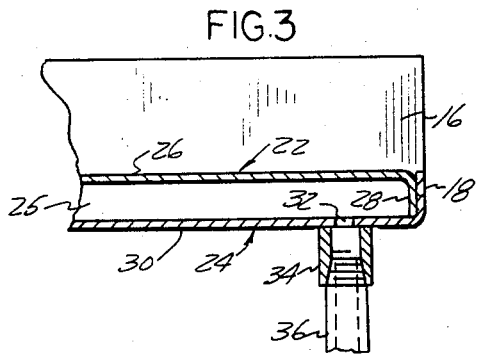
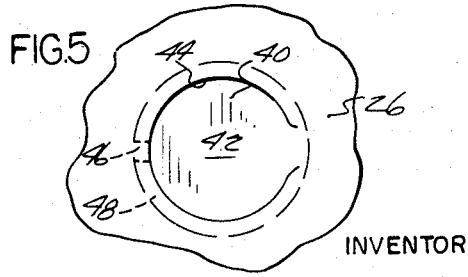
INVENTOR
LEON W. SMITH
BY Barthel & Bugbee
ATTORNEYS

# United States Patent Office 3,411,830
Patented Nov. 19, 1968

3,411,830
AIR-CUSHIONING PNEUMATIC CONVEYOR
Leon W. Smith, 75 Henderson St.,
Pontiac, Mich. 48053
Filed Nov. 14, 1966, Ser. No. 593,840
2 Claims. (Cl. 302—31)

ABSTRACT OF THE DISCLOSURE

Disclosed herein is a conveyor wherein the article or material to be conveyed is simultaneously raised above the bed of the conveyor chute and propelled forwardly along the chute by jets of compressed air discharged in an upward and forward direction through multiple air jet nozzle passageways opening into air expansion recesses disposed below the level of the top surface holes of the bed of the chute. This creates a forwardly-moving cushion of air on which the conveyed article rests while it is being conveyed, thereby reducing friction to a minimum while propelling the conveyed article forward, as from a machine tool or stamping press to a point of disposal or article receiver like a tote bin.

Brief summary of the invention

Briefly summarized, the invention consists of a chute having a hollow bottom wall or otherwise gas-tight bed provided with air expansion recesses extending downward from the top surface thereof and pierced by numerous obliquely-directed nozzle passageways opening into the rearward portions of said air expansion recesses and aimed upward and forward in the direction of propulsion desired for the article to be conveyed. Compressed air or other suitable compressed gas is supplied to the chamber in the hollow bed of the chute and emerges as jet streams directed obliquely upward and forward toward the outlet of the chute. These air streams expand into their respective recesses so as to exert a lifting force against the bottoms of the conveyed articles momentarily resting thereon. As a consequence, articles dropping onto the conveyor bed from a source of supply, such as a machine tool or workpiece ejector, are initially lifted out of contact with the bed surface and are then propelled along the chute parallel to the bed surface by the forwardly-moving cushion of air formed therebetween. This action thus produces an almost friction-free relationship between the conveyed articles and the chute, and eliminates the necessity in previous gravity conveyor chutes of tilting the chute downward sufficiently to enable the friction between the articles and chute to be overcome. This in turn eliminates the necessity of previously raising the machine so that its discharge chute can be thus tilted.

In the drawings, FIGURE 1 is a top perspective view of an air-cushioning pneumatic article conveyor, according to one form of the invention;

FIGURE 2 is a fragmentary vertical cross-section taken along either of the lines 2—2 in FIGURE 1;

FIGURE 3 is a fragmentary longitudinal vertical section taken along the line 3—3 in FIGURE 1;

FIGURE 4 is an enlarged longitudinal vertical section taken along the line 4—4 in FIGURE 1;

FIGURE 5 is a fragmentary top plan view of the central portion of FIGURE 4;

FIGURE 6 is a fragmentary top plan view similar to FIGURE 5 but showing a modification thereof; and FIGURE 7 is an enlarged central longitudinal vertical section through the modification shown in FIGURE 6.

Referring to the drawing in detail, FIGURE 1 shows an air-cushioned pneumatic article conveyor, generally designated 10, according to one form of the invention as having a chute 12 including a hollow bed 14 surrounded on three sides by upstanding side walls 16 and on the fourth side having a cutaway or low side wall 18 above which is located a discharge opening 20. For convenience of manufacture, the hollow bed 14 and the upstanding walls 16 are formed of two oppositely-facing shallow baking-pan-shaped members 22 and 24 (FIGURES 2 and 3), the upper member 22 being disposed inside the lower member 24 with the two baking-pan-shaped members 22 and 24 forming the hollow bed 14 and defining the air chamber 25 therebetween. The upper member 22 has a top wall 26 with downwardly-directed opposite side walls or edge flanges 28 (FIGURES 2 and 3) whereas the lower member 24 has a bottom wall 30 with the previously-mentioned upstanding side walls or edge flanges 16 of greater height than the side walls 28, except for the cutaway side wall 18 below the discharge opening 20. The bottom wall 30 is provided with an air inlet port 32 around which is welded an internally-threaded hollow cylindrical pipe coupling 34 (FIGURE 3) to which a compressed air supply pipe 36 is connected. The supply pipe 36 is in turn connected by way of a suitable valve (not shown) to a source of compressed air or other suitable compressed gas (also not shown).

The top wall 26 at laterally and longitudinally-spaced intervals therein is provided with upwardly and forwardly-inclined air expansion recesses 40, each having bottom walls 42 and an annular side wall 44 (FIGURE 4) opening into each air expansion recess is an air jet nozzle passageway 46 in the rearward portion 48 of the side wall 44. The recesses 40 and their upwardly-and-forwardly-inclined bottom walls 42 and variable-height side walls 44 are conveniently formed by punch-and-die or stamping operations in conventional presses.

In a similar manner, at locations corresponding to the locations of the recesses 40, the lower baking-pan-shaped member 24 is provided with upstanding protuberances 50 (FIGURE 4) each having a downwardly-and-rearwardly-inclined top wall 52 and variable-height annular side wall 54. Each side wall 54 and the downwardly-facing recess 56 caused thereby are of such height as to locate the wall 52 in alignment with and immediately below the inclined bottom wall 42 of each corresponding recess 40 (FIGURE 4) in contacting engagement therewith. This construction thus provides air jet nozzle passageways 46, the axes 58 of which are parallel to the upwardly-and-forwardly-inclined bottom wall 42 and coincide with the direction of jet air flow of the compressed air emerging through the nozzle openings 46 from the air chamber 25.

In the operation of the invention, let it be assumed that the chute 12 has been placed with its closed end adjacent the outlet of the machine or other source from which articles to be conveyed are dropped or otherwise deposited, and that the discharge opening 20 is disposed above or adjacent the point of article reception, such as a tote bin, a moving belt conveyor or the like. Due to the manner of operation of the conveyor 10, it does not require tilting in order to overcome the frictional drag of gravity present in ordinary conventional chutes and, provided the air jets emerging from the air jet nozzle passageways 46 are powerful enough, may even permit the discharge opening 20 to lie even with or above the rearward article intake location 60. As compressed air is supplied to the air chamber 25 in the hollow bed 14 through the air supply pipe 36, coupling jet 34 and air inlet port 32, it emerges at high velocity through the multiple air jet nozzle passageways 46 in the rearward portions 48 of the side walls 44 of the recesses 40 in the direction of the axis of each hole 46 as indicated by the arrow 58 (FIGURE 4). Any air which spreads downward after emerging from the air jet nozzle passageways 46 is immediately deflected upwardly and forwardly by the upwardly-and-forwardly-inclined bottom wall 42. The air, after emerging from the multiple air jet nozzle passageways 46 forms a moving belt-like cushion of compressed air which initially lifts the conveyed articles off the top wall 26 of the conveyor bed 14 and then propels the article toward and through the discharge opening 20 onto or into the chosen place of article disposal. Since the article being conveyed is lifted away from the top wall 26 out of contact therewith, it has no frictional engagement therewith and the only frictional effect present is that between the faster moving air cushion and the article being conveyed. This, however, is of negligible amount in contrast to the friction existing between an article and the bottom wall of a gravity chute in direct frictional contact therewith.

In the modified air-cushioning pneumatic conveyor, generally designated 70, shown in FIGURES 6 and 7, the general construction is the same as that shown in FIGURES 1 to 5 inclusive but the construction of the air jet nozzle passageways differs. In FIGURES 6 and 7, the top wall 72 is recessed toward the bottom wall 74 to provide elongated shallow air expansion recesses 76 in the top wall 72. The air expansion recesses 76 are provided with bottom wall portions 78 perforated with longitudinally-elongated air jet nozzle passageways 80 which communicate with elongated longitudinal air supply grooves 82 formed in the top wall portion 84 of the upstanding recess 86 in the bottom wall 74 and leading rearwardly to the air chamber 88 corresponding to the air chamber 25 of FIGURES 1 to 5 inclusive. The forward end portion of each groove 82 extends beneath and thus communicates with its respective nozzle passageway 80 and the forward end surface 90 of the groove 82 is inclined upward and forward so as to deflect the air passing from the air chamber 88 through the groove 82 in an upward and forward direction through each passageway 80. A spot weld is indicated by the numeral 92.

The operation of the modified construction 70 shown in FIGURES 6 and 7 is similar to that described above in connection with the air cushioning pneumatic conveyor 10 of FIGURES 1 to 5 inclusive, in that jet streams of high velocity compressed air are emitted upwardly and forwardly through the multiple passageways 80 in the air expansion recesses 76. This forms an air cushion which initially lifts the conveyed article or material out of frictional engagement with the top wall 72 and then propels it in a forward direction, namely from left to right in FIGURES 6 and 7.

I claim:

1. An air-cushioning pneumatic conveyor comprising a chute having a rearward inlet end and a forward outlet end and a hollow bed having a top surface extending from said inlet end to said outlet end, said bed having multiple air expansion recesses disposed below the level of said top surface and having multiple air jet nozzle passageways therein opening into said recesses near the rearward ends thereof and directed upward and forward toward said outlet end, an air chamber communicating with said nozzle passageways, and means for supplying compressed air to said air chamber, said recesses having bottom walls disposed approximately parallel to said top surface of said bed and having shouldered side walls, said air jet nozzle passageways being disposed in the rearward portions of said side walls.

2. An air-cushioning pneumatic conveyor comprising a chute having a rearward inlet end and a forward outlet end and a hollow bed having a top surface extending from said inlet end to said outlet end, said bed having multiple air expansion recesses disposed below the level of said top surface and having multiple air jet nozzle passageways therein opening into said recesses near the rearward ends thereof and directed upward and forward toward said outlet end, an air chamber communicating with said nozzle passageways, and means for supplying compressed air to said air chamber, said chute being composed of edge-flanged oppositely-facing upper and lower members secured to one another in interfitting relationship and forming said hollow bed, one of said members facing downward and containing said air expansion recesses with said air jet nozzle passageways, and the other member facing upward and having upwardly-projecting portions with top walls engaging the bottom walls of said recesses and having its edge flanges extending upward above said first-mentioned member along its rearward and opposite side edges.

References Cited

UNITED STATES PATENTS

| | | | |
|---|---|---|---|
| 1,515,965 | 11/1924 | Pardee. | |
| 3,180,688 | 4/1965 | Futer | 302—29 |
| 3,181,916 | 5/1965 | Epstein | 302—29 |
| 3,210,124 | 10/1965 | Niemi et al. | 302—29 X |

EVON C. BLUNK, *Primary Examiner.*

M. L. AJEMAN, *Assistant Examiner.*